(12) United States Patent
Park et al.

(10) Patent No.: US 9,288,448 B2
(45) Date of Patent: Mar. 15, 2016

(54) IMAGE-MONITORING DEVICE AND METHOD FOR DETECTING EVENTS THEREFOR

(75) Inventors: Youngkyung Park, Seoul (KR); Hyounghwa Yoon, Seoul (KR); Jaeshin Yu, Uiwang (KR); Sungjin Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 13/877,989

(22) PCT Filed: Oct. 8, 2010

(86) PCT No.: PCT/KR2010/006913
§ 371 (c)(1),
(2), (4) Date: Apr. 18, 2013

(87) PCT Pub. No.: WO2012/046899
PCT Pub. Date: Apr. 12, 2012

(65) Prior Publication Data
US 2013/0208115 A1     Aug. 15, 2013

(51) Int. Cl.
*H04N 7/18*     (2006.01)
*G06K 9/00*     (2006.01)
*G08B 13/19*    (2006.01)
*G08B 13/196*   (2006.01)

(52) U.S. Cl.
CPC .............. *H04N 7/18* (2013.01); *G06K 9/00771* (2013.01); *G08B 13/19615* (2013.01); *G08B 13/19669* (2013.01); *G08B 13/19671* (2013.01); *G08B 13/19682* (2013.01)

(58) Field of Classification Search
CPC ................. H04N 7/18; G06K 9/00771; G08B 13/19669; G08B 13/19671; G08B 13/19615
See application file for complete search history.

(56) References Cited

U.S. PATENT DOCUMENTS 8,132,725 B2 *  3/2012  Kundu et al. ................. 235/383
8,675,059 B2 *  3/2014  Johnson et al. ................. 348/77

(Continued)

FOREIGN PATENT DOCUMENTS

CN          101420595 A      4/2009
CN          101631237 A      1/2010

(Continued)

OTHER PUBLICATIONS

International Search Report issued in PCT Application No. PCT/KR2010/006913 dated Jul. 1, 2011.

(Continued)

*Primary Examiner* — Jefferey Harold
*Assistant Examiner* — Sean Haiem
(74) *Attorney, Agent, or Firm* — Ked & Associates, LLP

(57) ABSTRACT

Disclosed are an image monitoring device capable of detecting a meaningful event on the basis of a scenario by providing a function of setting various combinations of monitoring events in a monitored image in which a plurality of monitoring events are set, and an event detecting method thereof. The event detecting method of an image monitoring device includes: obtaining a monitored image; detecting an occurrence of a first monitoring event with respect to an object from the obtained monitored image; detecting an occurrence of a second monitoring event with respect to the object from the obtained monitored image; and storing information regarding the detected occurrence of the second monitoring event.

12 Claims, 11 Drawing Sheets

(56) References Cited

U.S. PATENT DOCUMENTS

| | | | |
|---|---|---|---|
| 2001/0012379 A1* | 8/2001 | Amemiya et al. | 382/103 |
| 2005/0151846 A1* | 7/2005 | Thornhill | 348/149 |
| 2005/0271250 A1* | 12/2005 | Vallone et al. | 382/103 |
| 2006/0227997 A1 | 10/2006 | Au et al. | |
| 2008/0074496 A1 | 3/2008 | Venetianer et al. | |
| 2010/0208064 A1* | 8/2010 | Liu et al. | 348/143 |

FOREIGN PATENT DOCUMENTS

| | | |
|---|---|---|
| KR | 10-0853744 | 8/2008 |
| KR | 10-2009-0026937 | 3/2009 |
| KR | 10-2010-0013469 | 2/2010 |
| WO | WO 2006/104903 A1 | 10/2006 |
| WO | WO 2007/078475 A2 | 7/2007 |
| WO | WO 2008/039401 A2 | 4/2008 |

OTHER PUBLICATIONS

European Search Report issued in Application No. 10858175.2 dated May 7, 2015.

Chinese Office Action issued in Application No. 201080069492.X dated Jul. 16, 2015.

* cited by examiner

IMAGE-MONITORING DEVICE AND METHOD FOR DETECTING EVENTS THEREFOR

CROSS-REFERENCE TO RELATED PATENT APPLICATIONS

This application is a U.S. National Stage Application under 35 U.S.C. §371 of PCT Application No. PCT/KR2010/006913, filed Oct. 8, 2010.

TECHNICAL FIELD

The present disclosure relates to an image monitoring device and a method for detecting an event of an image monitoring device, and more particularly, to a device for detecting an event set in a monitored image, and a method for detecting an event in the device.

BACKGROUND ART

In general, various monitoring methods and various monitoring devices are used for the purpose of security, or the like. One of monitoring devices is a monitoring system for monitoring and analyzing a monitored image obtained through a monitoring camera. In the monitoring system, a monitoring camera is installed in the vicinity of a monitoring region desired to be monitored, and an image obtained through the monitoring camera is provided to a user so that the user can easily recognize a particular situation desired to be monitored, or the like.

DISCLOSURE

Technical Problem

Therefore, an object of the present invention is to provide an image monitoring device capable of detecting a meaningful event on the basis of a scenario by providing a function of setting various combinations of monitoring events in a monitored image in which a plurality of monitoring events are set, and an event detecting method thereof.

Technical Solution

According to an aspect of the present invention, there is provided an event detecting method of an image monitoring device, including: obtaining a monitored image; detecting an occurrence of a first monitoring event with respect to an object from the obtained monitored image; detecting an occurrence of a second monitoring event with respect to the object from the obtained monitored image; and storing information regarding the detected occurrence of the second monitoring event.

In an embodiment of the present invention, the method may further include: before the obtaining of the monitored image, setting a plurality of monitoring events with respect to the obtained monitored image; and determining the first monitoring event and the second monitoring event among the plurality of set monitoring events.

In an embodiment of the present invention, the determining may include: inputting sequence information with respect to the plurality of monitoring events; and determining the first monitoring event and the second monitoring event among the plurality of set monitoring events on the basis of the sequence information.

In an embodiment of the present invention, in the determining, the first monitoring event and the second monitoring event, among the plurality of set monitoring events, may be determined on the basis of the sequence in which the plurality of monitoring events are set.

In an embodiment of the present invention, the method may further include: displaying a first monitoring item reflecting an attribute of the first monitoring event and a second monitoring item reflecting an attribute of the second monitoring event. Also, in an embodiment of the present invention, a shape of the first monitoring item and the second monitoring item may be at least one of a line or a closed curve including a polygonal shape. Also, in an embodiment of the present invention, at least one of positions in which the first monitoring item and the second monitoring item are displayed, sizes of the first monitoring item and the second monitoring item, and shapes of the first monitoring item and the second monitoring items may be set or changed by a user.

Also, in an embodiment of the present invention, the first monitoring event is a monitoring event the same as the second monitoring event.

Also, in an embodiment of the present invention, in the detecting of the occurrence of the second monitoring event, after the lapse of a predetermined time, the occurrence of the second monitoring event with respect to the object may be detected from the obtained monitored image.

Also, in an embodiment of the present invention, the method may further include: outputting information regarding the detected occurrence of the second monitoring event. Also, in an embodiment of the present invention, the method may further include: generating a warning message on the basis of the information regarding the detected occurrence of the second monitoring event; and outputting the warning message.

Also, in an embodiment of the present invention, the information regarding the detected occurrence of the second monitoring event may include at least one of identification information and attribute information regarding the object.

Also, in an embodiment of the present invention, the detecting of the occurrence of the first monitoring event may include identifying the object. Also, in an embodiment of the present invention, the detecting of the occurrence of the first monitoring event may include tracing the identified object.

According to an aspect of the present invention, there is provided an image monitoring device including: an image processing unit configured to obtain a monitored image; a monitoring control unit configured to detect an occurrence of a first monitoring event with respect to an object from the obtained monitored image and detect an occurrence of a second monitoring event with respect to the object from the obtained monitored image; and a storage unit configured to store information regarding the detected occurrence of the second monitoring event.

Advantageous Effects

According to embodiments of the present invention, a meaningful event may be detected on the basis of various combinations of a plurality of events set in a monitored image. Thus, a waste of a storage space due to an unnecessary event detection can be prevented. In particular, an occurrence of an event desired to be monitored from a standpoint of a user can be accurately and quickly detected, maximizing efficiency of image monitoring.

BEST MODES

Hereinafter, an image monitoring device and an event monitoring method thereof according to according to embodiments of the present invention will be described with reference to FIGS. 1 through 19.

Definition

A term 'object' described in the present disclosure refers to a person, a thing (or a material object), or the like, as a monitoring target in a monitored image. For example, a person or an object determined to move may be a target.

Also, a term 'event' described in the present disclosure refers to an event or facts that may occur in a monitored image. Also, a term 'monitoring event' refers to an event set for effectively achieving a monitoring object of a user.

Also, a term 'combining events' described in the present disclosure refers to a plurality of combined events set in a monitored image. Also, a term 'combining of monitoring events' refers to a plurality of combined events set for effectively achieving a monitoring object of a user.

Also, a term 'monitoring item' described in the present disclosure refers to an item displayed to indicate a region or a position desired for setting a monitoring event. For example, in order to set a monitoring event, a user may set a monitoring item such as a virtual line or region in monitored images being displayed.

Description of Image Monitoring System

Figure 1:
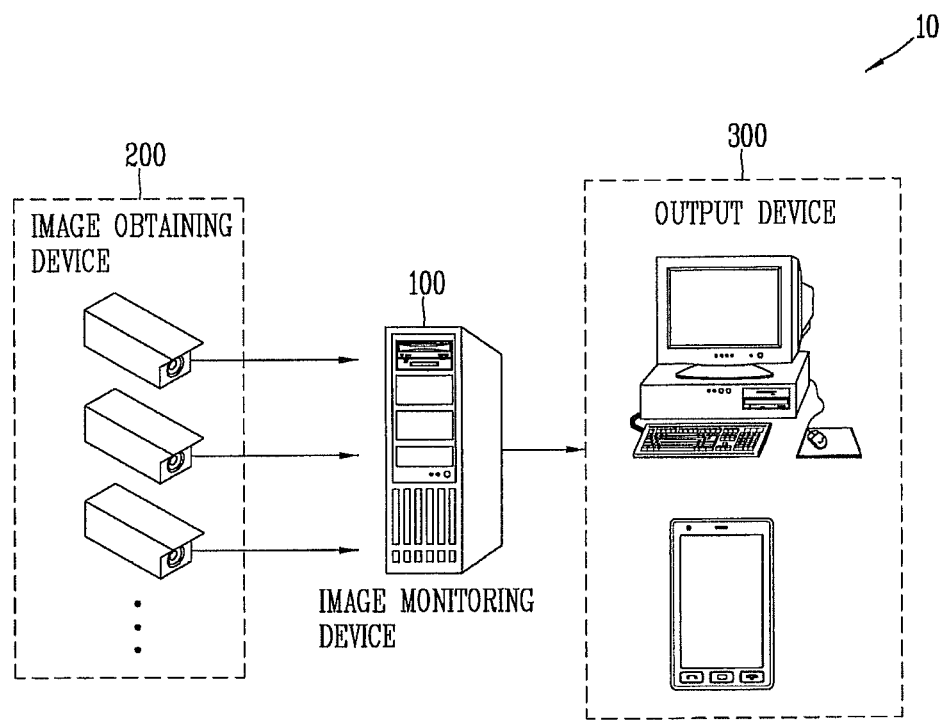
FIG. 1 is a view illustrating an image monitoring system according to an embodiment of the present invention.

FIG. 1 is a view illustrating an image monitoring system according to an embodiment of the present invention. An image monitoring system 10 according to an embodiment of the present invention obtains a monitored image through one or more image obtaining devices 200, processing and analyzing the obtained monitored images, and provides the processing and analysis results to a user through an output device 300. The image monitoring system 10 may include an image monitoring device, the image obtaining device 200, and the output device 300.

The image monitoring device 100 analyzes an image obtained through the image obtaining device 200 to generate a compressed image and meta data. Also, the image monitoring device 100 searches meta data for detecting an occurrence of a monitoring event set in a monitored image, and when an occurrence of the monitoring event is detected, the image monitoring device 100 outputs information regarding the detected occurrence of the monitoring event to the output device 300.

In an embodiment, information regarding the detected occurrence of the monitoring event may include a warning message. Also, the meta data may include an ID of an object, a type (e.g., a person, a stuff, or the like) of the object, a time stamp, a current location of the image obtaining device 200, a previous location of the image obtaining device 200, direction data, and the like.

The image obtaining device 200 obtains a monitored image in a monitored environment. The image obtaining device 200 may include a camera (e.g., an optical sensor, a steel camera, an analog image camera, a digital image camera, and the like).

The output device 300 may output the processing and analysis results of the monitored image received from the image monitoring device 100 and the information regarding the occurrence of the monitoring event detected from the monitored image. The output device 300 may be a terminal, a network computer, a wireless device (e.g., a PDA), a wireless phone, an information home appliance, a work station, a mini-computer, a main frame computer, a multi-purpose computer, a hardware device dedicated to the image monitoring system 10, or the like.

In an embodiment, a user may remotely receive the processing and analysis results of the monitored image by the output device 300 having a text, messaging, and image function. Also, the user may receive a warning message generated by the image monitoring device 100 by the output device 300. In an embodiment, the warning message may include an image.

Also, the output device 300 may sound an alarm on the basis of the warning message. Alternatively, the output device 300 may transmit a text message by using a previously registered phone number, output a previously stored voice by dialing the phone number, or converting previously stored text into voice and outputting the same, to inform the user that the monitoring event has occurred. The conversion of text into voice may be performed by using a text-to-speech (TTS) technique. Alternatively, the output device 300 may flicker a monitoring item corresponding to a region in which the monitoring event has occurred, to allow the user easily recognize where the monitoring event has occurred.

In this manner, when the image monitoring system 10 sets a monitoring event, and when the monitoring event occurs, the image monitoring system 10 informs the user accordingly. Thus, although the monitoring region is wide, the user can easily do monitoring activities. Also, the image monitoring system 10 may store a monitored image when a pre-set monitoring event occurs, rather than storing all the monitored images. However, even in the case in which a monitoring event is set, the image monitoring system 10 may store a monitored image although a monitoring event does not occur (i.e., regardless of whether or not a monitoring event occurs.

Description of Image Monitoring Device

Figure 2:
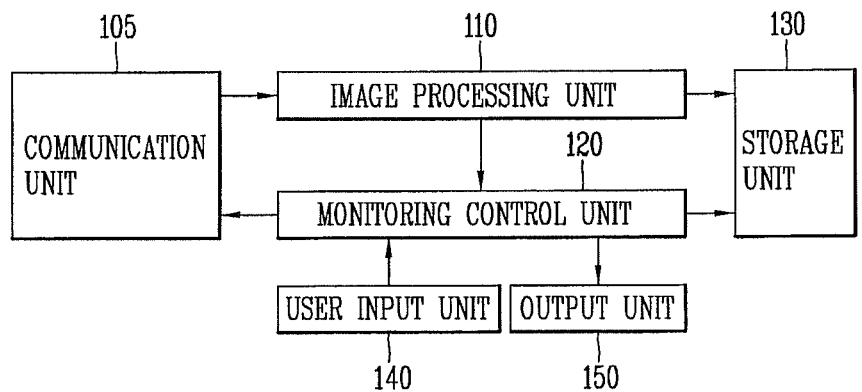
FIG. 2 is a block diagram of an image monitoring device according to an embodiment of the present invention.

FIG. 2 is a block diagram of an image monitoring device according to an embodiment of the present invention. The image monitoring device 100 according to an embodiment of the present invention includes a communication unit 105, an image processing unit 110, a monitoring control unit 120, and a storage unit 130.

In order to allow the image monitoring device 100 to communicate with the image obtaining device 200 and/or the output device 300, the communication unit 105 may perform modulation/demodulation and coding/decoding operation on signals transmitted and received to and from the image obtaining device 200 and/or the output device 300. The communication unit 105 may transmit and receive image signals or data to and from the image obtaining device 200 and/or the output device 300 through various communication paths such as a local area network (LAN), a wide area network (WAN, e.g., T1, T3, 56 kb, X.25, ISDM, Frame-Relay, ATM), a wireless network (802.11, Bluetooth™, or the like), universal serial bus (USB), an IEEE 1394 (FireWire), or the like.

The image processing unit 110 analyzes an image obtained from the image obtaining device 200 and generates compressed image data and meta data. The image processing unit 110 stores the generated image data in the storage unit 130, and outputs the meta data to the monitoring control unit 120.

In order to detect an occurrence of a monitoring event set in a monitored image, the monitoring control unit 120 may search the meta data received from the image processing unit 110, and when an occurrence of a monitoring event is detected, the monitoring control unit 120 outputs information regarding the detected occurrence of a monitoring event to the output device 300. Also, the monitoring control unit 120 stores the meta data and the information regarding the detected occurrence of the monitoring event in the storage unit 130.

The storage unit 130 stores an objected image through the image obtaining device 200. The storage unit 130 includes a video cassette recorder (VCR), a digital video recorder (VDR), a redundant array of independent disk (RAID) array, a universal serial bus (USB) hard drive, an optical disk recorder, a flash storage device, an image analyzing device, a multi-purpose computer, a multi-dimensional imaging device, a deinterlacer, a scaler, and/or a processing and storing element for storing and/or processing an image.

The monitored image may be obtained in various analog and/or digital formats. For example, the monitored image may include a non-compressed digital signal using an NTSC (Nation Television System Committee), PAL (Phase Alternating Line), SECAM (Sequential Color with Memory), DVI (Digital Video/visual Interactive), or HDMI (High-Definition Multimedia Interface) connection, and/or a digital signal compressed on the basis of a codec format (e.g., MPEG, MPEG2, MPEG4, or H.264).

Also, the storage unit 130 may store meta data and information regarding a detected occurrence of monitoring event under the control of the monitoring control unit 120.

Meanwhile, the image monitoring device 100 may further include: a user input unit 140 and an output unit 150.

The user input unit 140 may receive an input command applied by the user to control an operation of the image monitoring device 100, and delivers the received command to the monitoring control unit 120 to allow the monitoring control unit 120 to operate according to the command. The user input unit 140 may include a key pad, a dome switch, a touch pad (e.g., static pressure/capacitance), a jog wheel, a jog switch, and the like.

The output unit 150 serves to output an image signal or an alarm signal. The output unit 150 may include a display unit (not shown) outputting the processing and analysis results of a monitored image in the image monitoring device 100 and information regarding a detected occurrence of a monitoring event, an audio output module (not shown), and an alarm unit (not shown) that sounds an alarm on the basis of an alarm message generated by the monitoring control unit 120.

Meanwhile, according to an embodiment of the present invention, upon receiving meta data from the image processing unit 110, the monitoring control unit 120 determines whether a first monitoring event set in a monitored image with respect to an object occurs. The monitoring control unit 120 searches meta data to detect an occurrence of a first monitoring event with respect to an object. During this process, the monitoring control unit 120 may identify an object in relation to an occurrence of the first monitoring event.

Also, when the first monitoring event with respect to the object occurs, the control unit 120 may determine whether a second monitoring event set in the monitored image occurs with respect to the object in relation to the occurrence of the first monitoring event. The monitoring control unit 120 searches meta data for detecting an occurrence of the second monitoring event with respect to the object in relation to the occurrence of the first monitoring event. During this process, the monitoring control unit 120 may trace the object in relation to the occurrence of the first monitoring event.

Also, when the second monitoring event occurs with respect to the object in relation to the occurrence of the first monitoring event, the monitoring control unit 120 may store information regarding the occurrence of the second monitoring event in the storage unit 130. Also, the monitoring control unit 120 may output information regarding the occurrence of the second monitoring event to the output device 300. Also, the monitoring control unit 120 may generate a warning message on the basis of the information regarding the occurrence of the second monitoring event, and output the generated warning message to the output device 300.

Structure of image data and meta data

Figure 3A:
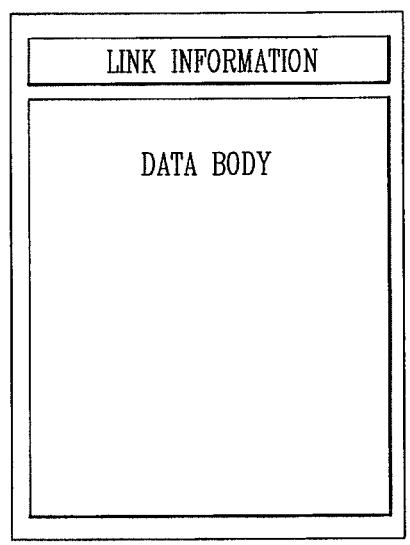
FIGS. 3(a) and 3(b) are views illustrating structures of image data and meta data according to an embodiment of the present invention.
Figure 3B:
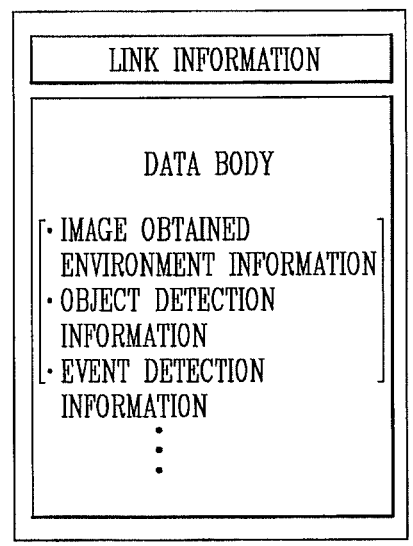

FIGS. 3(a) and 3(b) are views illustrating structures of image data and meta data according to an embodiment of the present invention.

Image data and meta data include link information and a data body, respectively. The data body of the image data is data of a monitored image. Also, data body of meta data includes information indicating a monitoring target and attribute information defining a describing method with respect to the information indicating a monitoring target. Link information includes relevant information indicating relevancy between image data and meta data, and attribute information defining a description method with respect to content of the relevant information.

Relevant information uses, for example, a time stamp or a sequence number for specifying image data. The time stamp indicates information (time information) indicating a time at which image data was generated. Also, the sequence number refers to information (sequence information) indicating a generation sequence of contents data. When there are a plurality of monitored images having the same time stamp, a generation sequence of the image data having the same time stamp may be identified. Also, the relevant information may include information (e.g., a name of a manufacturer, a name of type, a serial number, or the like) for specifying the image obtaining device.

In order to describe the link information and/or meta data body, a markup language defined to describe information exchanged in the Web may be used. In this manner, the use of mark-up language facilitates exchange of information through a network. In addition, when a markup language, e.g., XML used to exchange documents or electronic data, is used image data and meta data can be easily exchanged. In case that XML is used, for example, XML Scheme is used as attribute information.

According to an embodiment of the present invention, data body of the meta data may include information regarding an environment in which an image is obtained including a location, an angle, or the like, of the image obtaining device 200, object detection information including an ID, characteristics, and the like, of a detected object, an event detection information including whether a monitoring event set in a monitored image occurs, and the like.

Structure of Combination Information Table

Figure 4A:
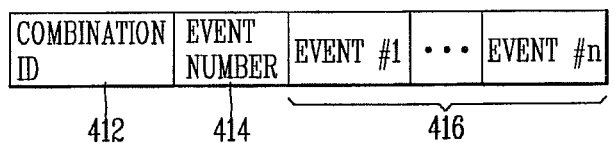
FIG. 4 is a view illustrating a structure of a combination information table of monitoring events according to an embodiment of the present invention.
Figure 4B:
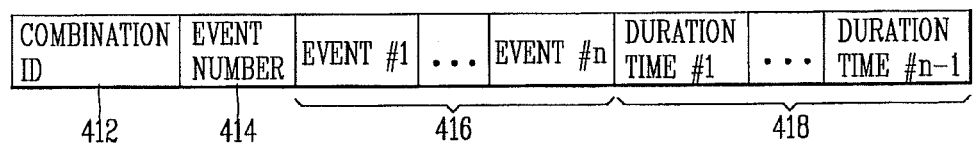

FIG. 4 is a view illustrating a structure of a combination information table of monitoring events according to an embodiment of the present invention.

Referring to FIG. 4(*a*), a combination information table includes an identification information field 412, a monitoring event number field 414, and monitoring event identification information field 416. The identification information field 412 refers to an identifier for discriminating a combination of monitoring events from a different combination. The monitoring event number field 414 refers to a number of monitoring events included in the combination of the monitoring events. The monitoring event identification information field 416 refers to identification information of each monitoring event included in the combination of the monitoring events. The monitoring event identification information field 416 may include identification information regarding a first monitoring event, identification information regarding a second monitoring event, and identification information regarding nth monitoring event (n is a natural number).

In this manner, various scenarios may be generated according to combinations of the plurality of monitoring events set in the monitored image. In an embodiment, a first combination of monitoring events may refer to that after an occurrence of a first monitoring event with respect to an object is detected, an occurrence of a second monitoring event with respect to the object in relation to the occurrence of the first monitoring event is detected. Also, a second combination of monitoring events may refer to that after an occurrence of a second monitoring event with respect to an object is detected, an occurrence of a first monitoring event with respect to the object in relation to the occurrence of the first monitoring event is detected.

In an embodiment, the first monitoring event and the second monitoring event may be the same monitoring event. In this case, the combination of monitoring events may refer to that an occurrence of the first monitoring event with respect to the same object is continuously detected twice.

Meanwhile, referring to FIG. 4(*b*), the combination information table may further include a duration time field 418. The duration time field 418 refers to a duration time between respective monitoring events included in a combination of monitoring events. A duration time corresponding to a first monitoring event, a duration time corresponding to a second monitoring event, . . . , a duration time corresponding to an (n−1)th monitoring event (n is a natural number) may be input in this order.

In an embodiment, a combination of monitoring events may refer to that after an occurrence of a first monitoring event with respect to an object is detected, an occurrence of a second monitoring event with respect to the object in relation to the occurrence of the first monitoring event is detected after the lapse of a duration time.

Description of Process of Detecting Monitoring Event

Figure 5:
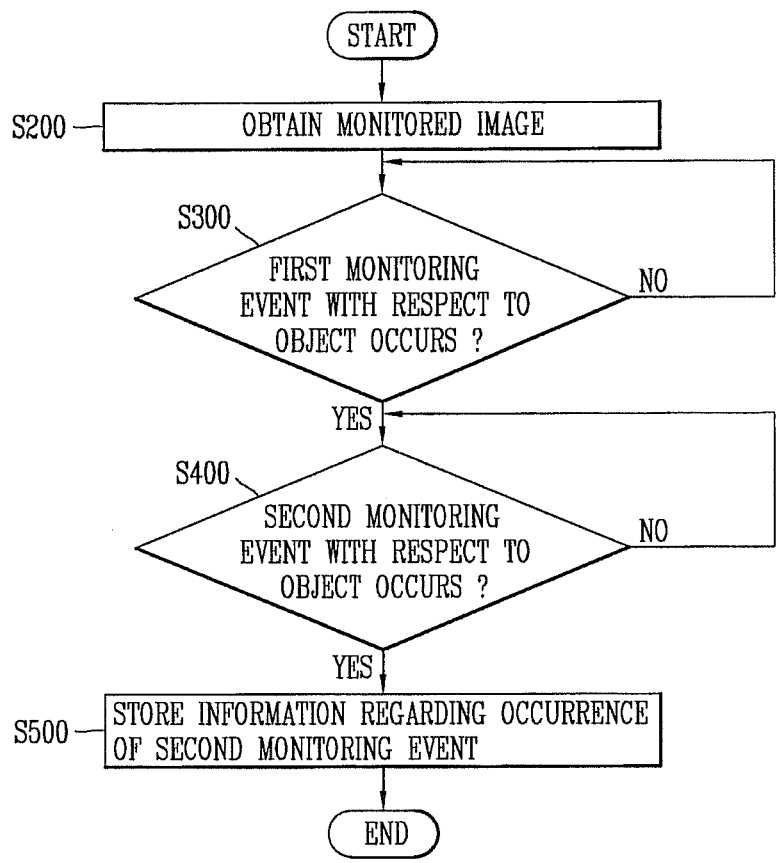
FIG. 5 is a flow chart illustrating a process of detecting a monitoring event according to an embodiment of the present invention.

FIG. 5 is a flow chart illustrating a process of detecting a monitoring event according to an embodiment of the present invention.

First, the image processing unit 110 obtains a monitored image from the image obtaining device 200 (S200). Also, the image processing unit 110 analyzes the obtained monitored image and generates compressed image data and meta data. Also, the image processing unit 110 stores the generated image data in the storage unit 130 and outputs the generated meta data to the monitoring control unit 120.

In step S200, upon receiving the meta data from the image processing unit 110, the monitoring control unit 120 determines whether a first monitoring event set in a monitored image with respect to an object occurs (S300). The monitoring control unit 120 searches meta data for detecting an occurrence of the first monitoring event with respect to the object. During this process, the monitoring control unit 120 may identify an object in relation to the occurrence of the first monitoring event.

In step S300, when the first monitoring event with respect to an object occurs, the monitoring control unit 120 determines whether a second monitoring event set in a monitored image occurs with respect to the object in relation to the occurrence of the first monitoring event (S400). The monitoring control unit 120 searches meta data in order to detect an occurrence of the second monitoring event with respect to the object in relation to the occurrence of the first monitoring event. During this process, the monitoring control unit 120 may trace the object in relation to the occurrence of the first monitoring event.

In step S400, when the second monitoring event with respect to the object in relation to the occurrence of the first monitoring event occurs, the monitoring control unit 120 stores information regarding the occurrence of the second monitoring event in the storage unit 130 (S500). Also, the monitoring control unit 120 may output the information regarding the occurrence of the second monitoring event to the output device 300. Also, the monitoring control unit 120 may generate a warning message on the basis of the information regarding the occurrence of the second monitoring event, and output the generated warning message to the output device 300.

Figure 6:
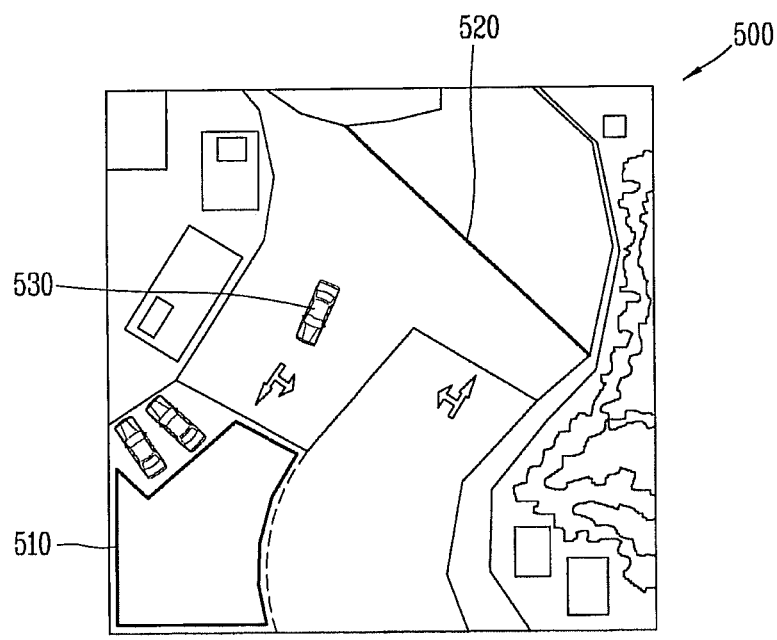
FIGS. 6 through 8 are conceptual views illustrating a process of detecting a monitoring event according to an embodiment of the present invention.
Figure 7:
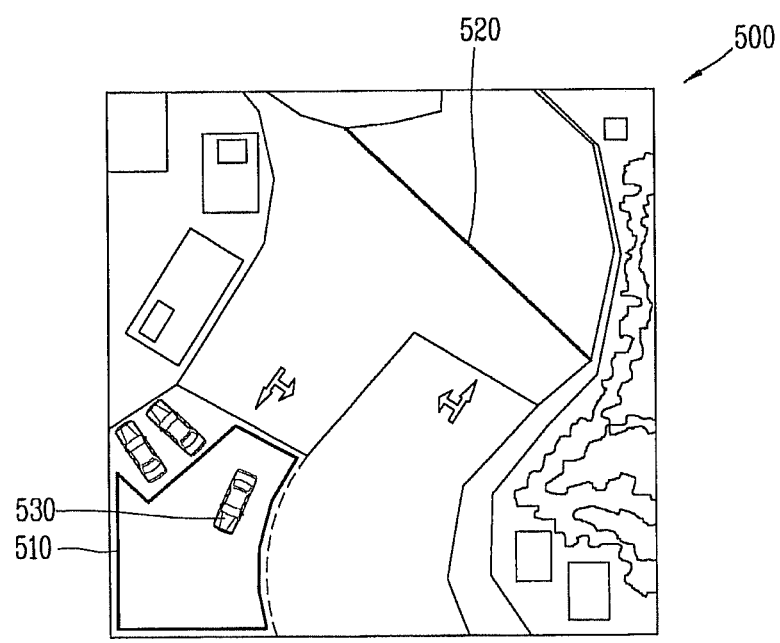
Figure 8:
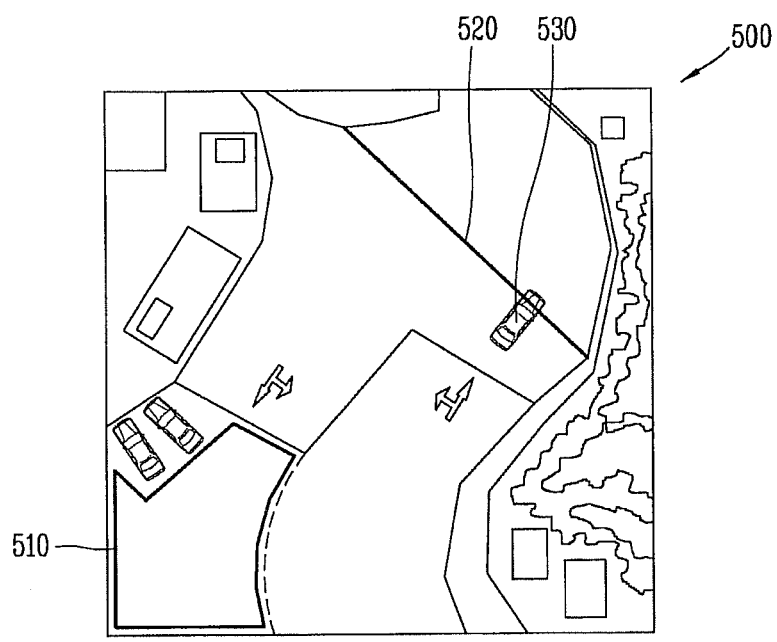

FIGS. 6 through 8 are conceptual views illustrating a process of detecting a monitoring event according to an embodiment of the present invention.

Referring to FIG. 6, a monitored image obtained through the image obtaining device 200 includes a plurality of monitoring events set therein. A monitoring item 510 indicating a first monitoring event is an item for determining whether a region corresponding to the monitoring item is invaded. Also, a monitoring item 520 indicating a second monitoring event is an item for determining whether an object has passed the region corresponding to the monitoring item.

A shape of the monitoring item indicating a monitoring event may include a line or a closed curve including a polygonal shape. In an embodiment, the monitoring item 510 indicating a first monitoring event has a polygonal shape, and the monitoring item 520 indicating a second monitoring event has a linear shape.

Also, a monitoring item indicating a monitoring event may reflect an attribute of a monitoring event corresponding to the monitoring item. In an embodiment, the monitoring item 510 indicating a first monitoring item is to determine whether an object has invaded, and the monitoring item 520 indicating a second monitoring event is to determine whether an object has passed.

Also, at least one of a position in which the monitoring item is displayed, a size of the monitoring item, and a shape of the monitoring item may be set or changed by the user. In an embodiment, the monitoring item 510 indicating a first monitoring event and the monitoring item 520 indicating a second monitoring event may be moved, a size thereof may be increased or decreased, or a shape thereof may be changed, according to a user input.

The monitoring control unit 120 determines whether the first monitoring event set in a monitored image with respect to an object occurs. In FIG. 6, none object has invaded the monitoring item 510 indicating a first monitoring event, and thus, the monitoring control unit 120 continuously determines whether a first monitoring event occurs.

In FIG. 7, since an object 530 has invaded the monitoring item 510 indicating a first monitoring event, the monitoring control unit 120 determines whether a second monitoring event set in the monitored image with respect to the object 530 occurs. To this end, the monitoring control unit 120 may identify the object 530, and trace the identified object 530. Simultaneously, the monitoring control unit 120 may continuously determine whether the first monitoring event with respect to a different object occurs.

In FIG. 8, since a traced object 530 has passed through the monitoring item 520 indicating a second monitoring event, the monitoring control unit 120 may store information regarding the occurrence of the second monitoring event in the storage unit 130 and/or output the same to the output device 300. The information regarding the occurrence of the second monitoring event may include identification information (ID) regarding a combination of monitoring events, information regarding an attribute (at least one of a size, a speed, and a color) of the object 530, and information regarding a time at which the event occurred.

Description of Process of Setting Event

Figure 9:
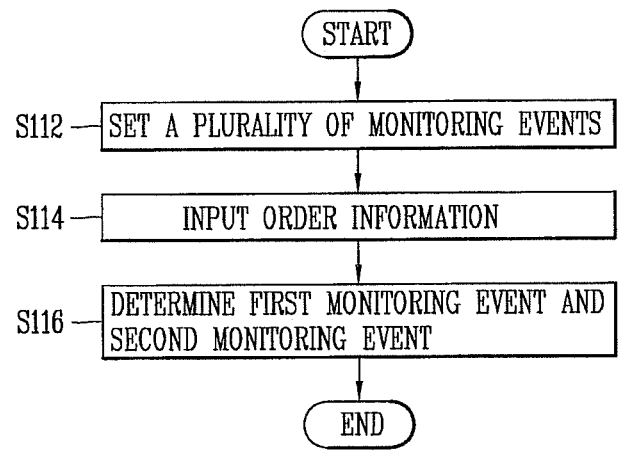
FIG. 9 is a flow chart illustrating a process of setting a monitoring event according to an embodiment of the present invention.

FIG. 9 is a flow chart illustrating a process of setting a monitoring event according to an embodiment of the present invention.

The monitoring control unit 120 sets a plurality of monitoring events in a monitored image (S112). For example, a plurality of monitoring events may be set in a monitored image according to a user input.

The monitoring control unit 120 receives sequence information regarding the plurality of monitoring events set in the monitored image from the user (S114). The monitoring control unit 120 may store the input sequence information in the storage unit 130.

Also, the monitoring control unit 120 may determine a first monitoring event and a second monitoring event among the plurality of monitoring events set on the basis of the input sequence information (S116). The monitoring control unit 120 may store identification information regarding the determined first monitoring event and the second monitoring event in the storage unit 130.

Figure 10:
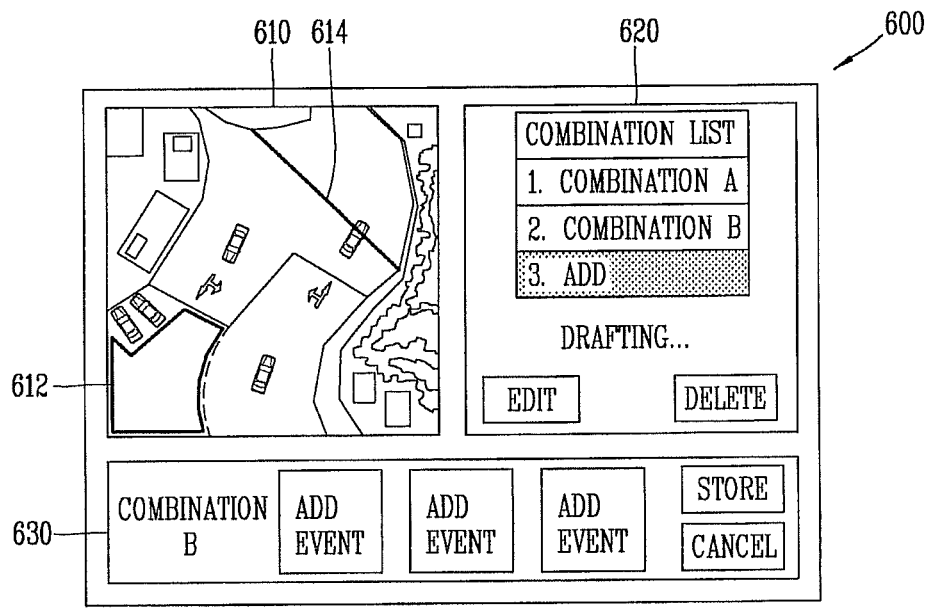
FIGS. 10 through 12 are views illustrating screens for setting a monitoring event in a monitored image according to an embodiment of the present invention.
Figure 11:
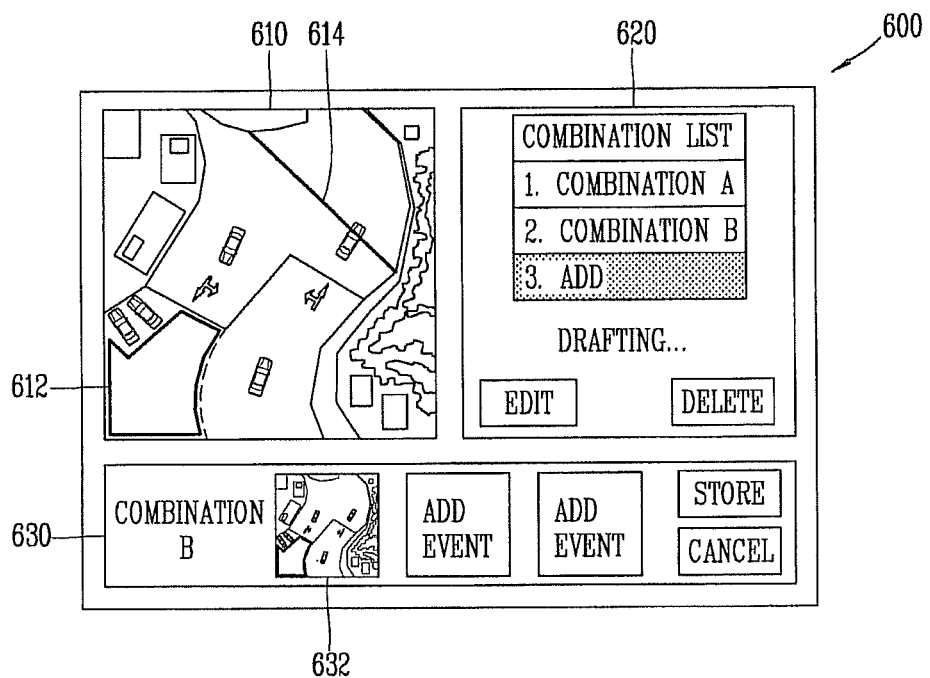
Figure 12:
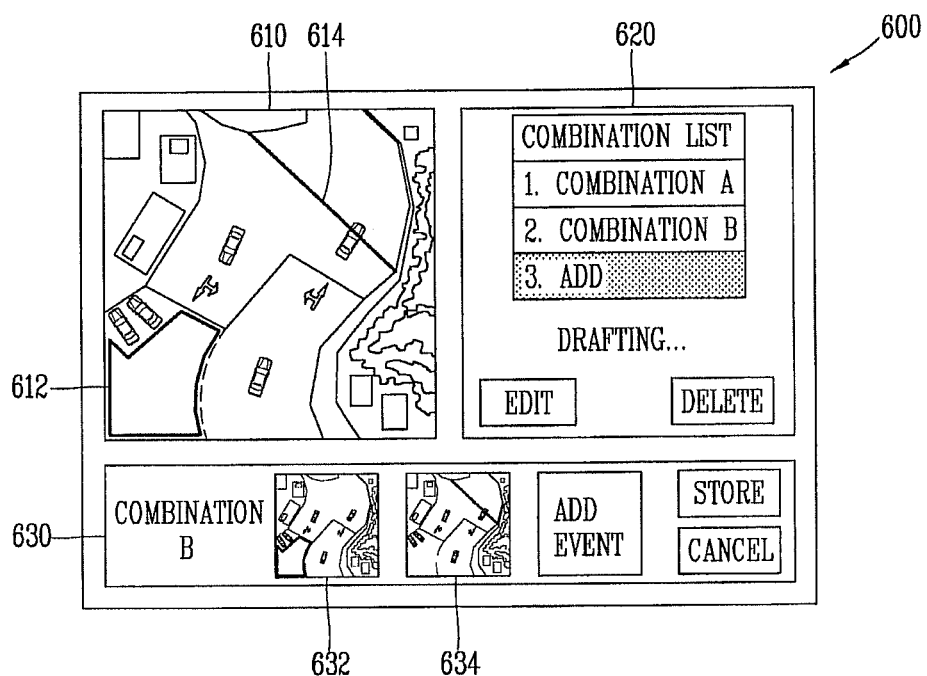

FIGS. 10 through 12 are views illustrating screens for setting a monitoring event in a monitored image according to an embodiment of the present invention.

A set screen 600 of a monitoring event includes a first region 610 outputting a monitored image, a second region 620 managing a list of scenarios set in the monitoring events, and a third region 630 setting a combination of monitoring events. The first region 610 includes an output monitored image and a plurality of monitoring events 612 and 614 set in the monitored image. The second region 620 includes menus for generating, correcting, and deleting combinations. The third region 630 includes an item for setting the sequence (or order) of the plurality of events 612 and 614.

Referring to FIG. 10, the user may set a monitoring event in a state that the monitored image is displayed in the first region 610. The monitoring event may be set by generating a monitoring item corresponding to the monitoring event. When the user generates the monitoring items 612 and 614 in the first region, the monitoring events corresponding to the monitoring items 612 and 614 are set. In this case, the user may generate a combination of the monitoring events through the second region 620. Namely, when the user selects an addition item in the second region 620, windows allowing for inputting of the sequence (or order) of the monitoring events set in the first region 610 are generated in the third region 630.

Referring to FIG. 11, with the plurality of monitoring items displayed in the first region 610, the user may position the monitoring item 612 in the first window 632. For example, the user may drag-and-drop the monitoring item 612 to the first window 632. Or, when the user selects the first window 632, the plurality of monitoring items set in the monitored image are displayed and the user can select the monitoring item 612. In this case, the monitoring item 612 corresponds to a first monitoring event.

Referring to FIG. 12, with the plurality of monitoring items displayed in the first region 610, the user may position a monitoring item 614 in a second window 634. For example, the user may drag-and-drop the monitoring item 614 to the second window 634. Or, when the user selects the second window 634, a plurality of monitoring items set in the monitored image may be displayed and the user may select the monitoring item 614. In this case, the monitoring event 614 corresponds to a second monitoring event.

Figure 13:
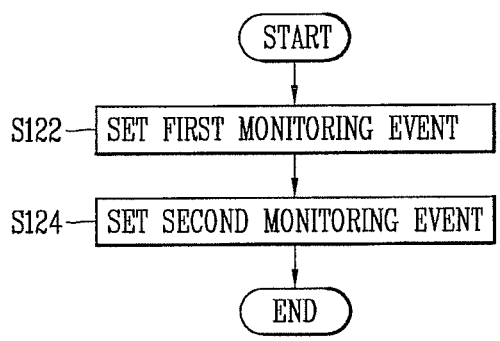
FIG. 13 is a flow chart illustrating a process of setting a monitoring event according to another embodiment of the present invention.

FIG. 13 is a flow chart illustrating a process of setting a monitoring event according to another embodiment of the present invention.

The monitoring control unit 120 sets a first monitoring event in a monitored image (S122). For example, the first monitoring event may be set in the monitored image according to a user input.

The monitoring control unit 120 sets a second monitoring event in the monitored image (S124). For example, the second monitoring event may be set in the monitored image according to a user input. The monitoring control unit 120 may store identification information regarding the set first monitoring event and the second monitoring event in the storage unit 130.

Figure 14:
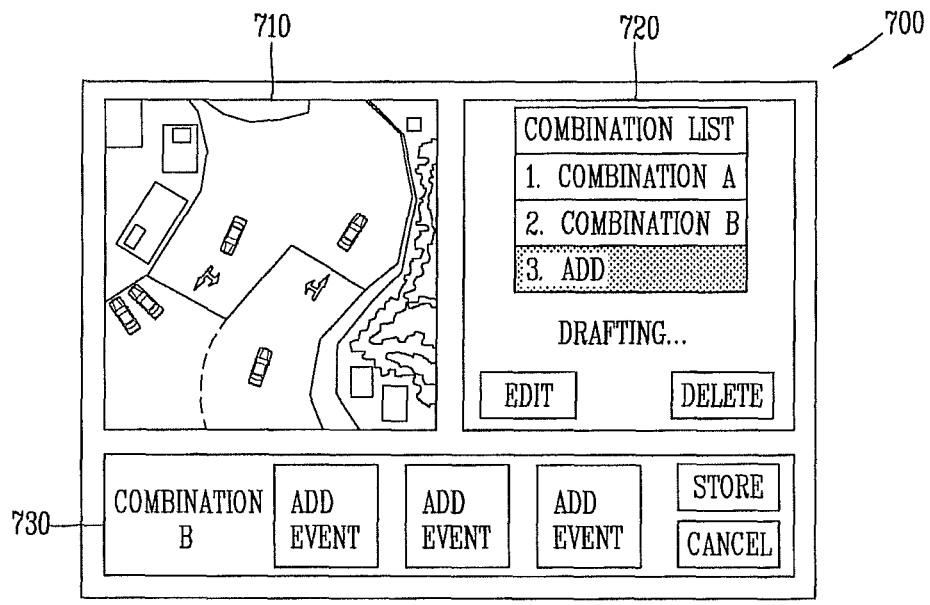
FIGS. 14 through 16 are views illustrating screens for setting a monitoring event in a monitored image according to another embodiment of the present invention.
Figure 15:
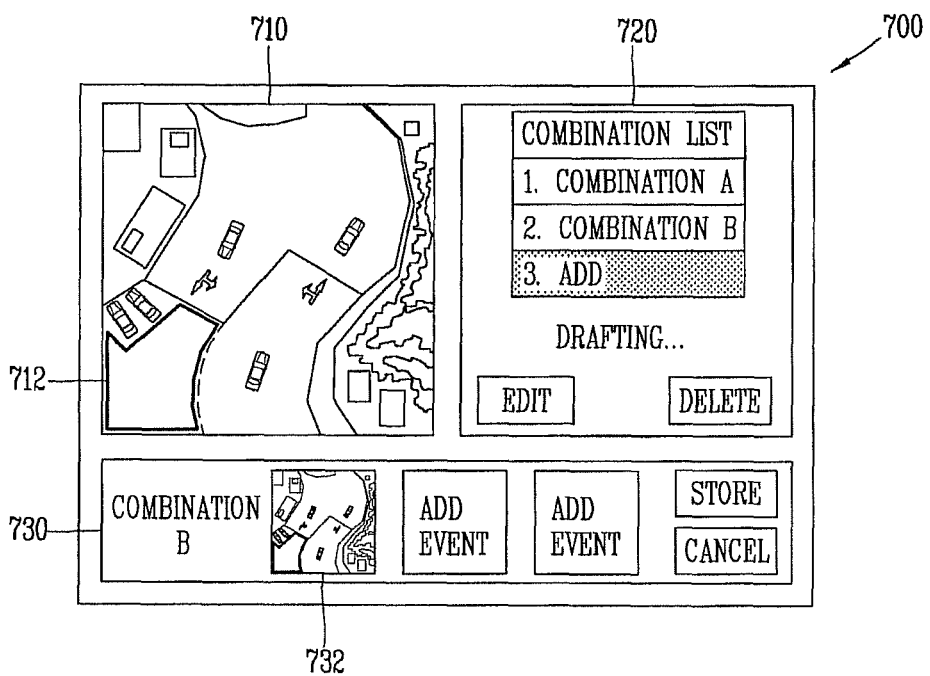
Figure 16:
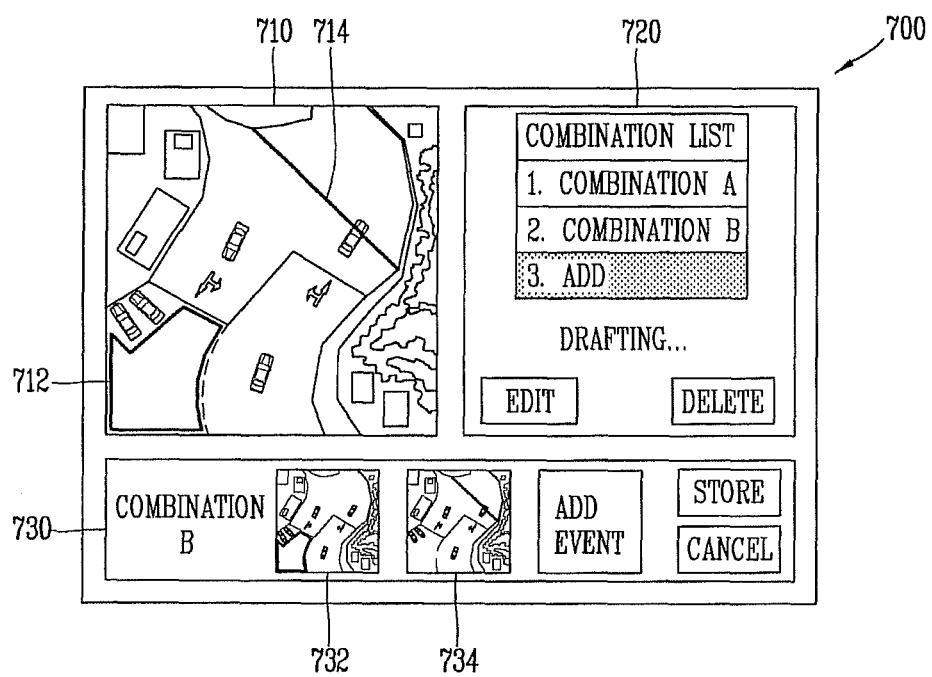

FIGS. 14 through 16 are views illustrating screens for setting a monitoring event in a monitored image according to another embodiment of the present invention.

The set configuration 700 of the monitoring event includes a first region 710 outputting a monitored image, a second region 720 managing a list of scenarios set in the monitoring events, and a third region 730 setting a combination of monitoring events. The first region 710 includes an output monitored image. The second region 720 includes menus for generating, correcting, and deleting a combination of monitoring events. The third region 730 includes an item for setting a monitoring event.

Referring to FIG. 14, the user may generate a combination of monitoring events through the second region 720. When the user selects an addition item in the second region 720, window allowing for the user input monitoring events sequentially (or in order) are generated in the third region 730.

Referring to FIG. 15, when the user selects a first window 732, the monitored image is displayed in the first region 710 and the user may set a monitoring event. The monitoring event may be set by generating a monitoring item corresponding to the monitoring event. When the user generates the monitoring item 712 in the first region 710, the monitoring event corresponding to the monitoring item 712 is set. In this case, the monitoring item 712 corresponds to a first monitoring event.

Referring to FIG. 16, when the user selects a second window 734, the monitored image is displayed in the first region 710 and the user may set a monitoring event. The monitoring event may be set by generating a monitoring item corresponding to the monitoring event. When the user generates the monitoring item 714 in the first region 710, the monitoring event corresponding to the monitoring item 714 is set. In this case, the monitoring item 714 corresponds to a second monitoring event.

Figure 17:
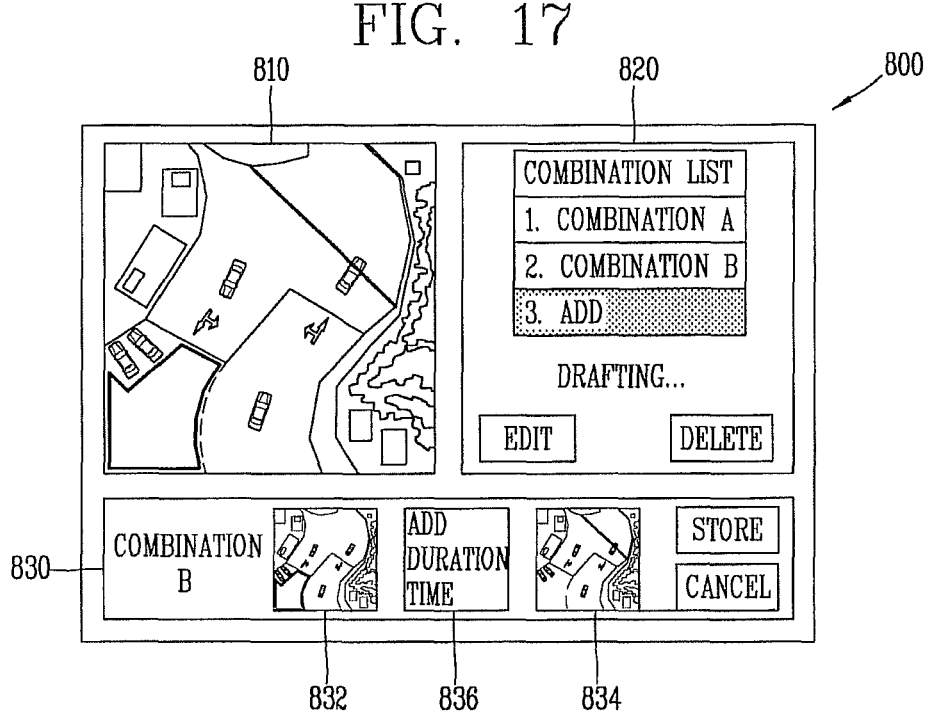
FIGS. 17 through 19 are views illustrating screens for inputting a duration time between monitoring events set in a monitored image according to embodiments of the present invention.
Figure 18:
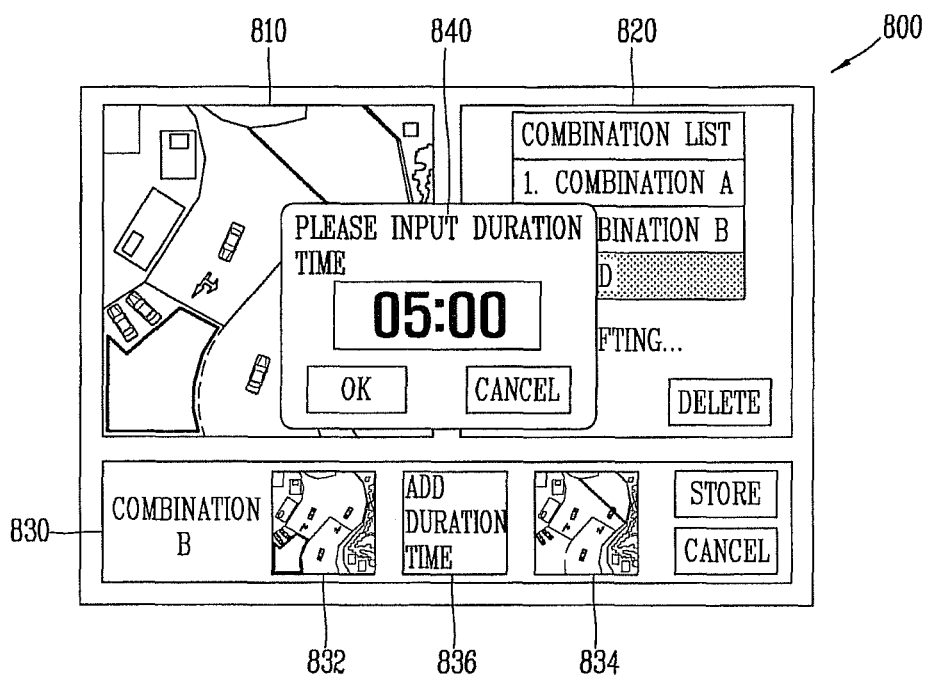
Figure 19:
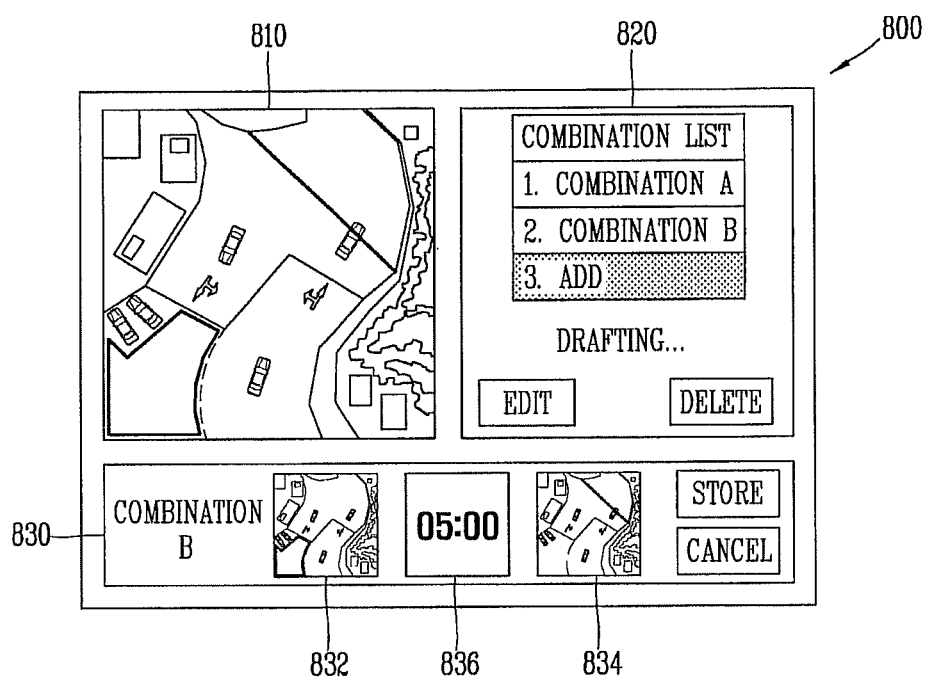

FIGS. 17 through 19 are views illustrating screens for inputting a duration time between monitoring events set in a monitored image according to embodiments of the present invention.

An input screen 800 of a duration time includes a first region 810 outputting a monitored image, a second region 820 managing a list of scenarios set in the monitoring events, and a third region 830 setting a combination of monitoring events. The first region 810 includes an output monitored image. The second region 820 includes menus for generating, correcting, and deleting a combination of monitoring events. The third region 830 includes an item for setting a monitoring event.

Referring to FIG. 17, in a state in which a first monitoring event is set through a first window 832 and a second monitoring event is set through a second window 834 in the third region 830, the user may select a third window 836 positioned between the first window 832 and the second window 834.

Referring to FIG. 18, when the user selects the third window 836, a fourth region 840 including an item for inputting a duration time between the first monitoring event and the second monitoring event is displayed. The user may input a duration time through the item allowing for inputting of a duration time.

Referring to FIG. 19, when the user inputs a delay time, the input duration time is displayed in the third window 836. In this case, in the image monitoring device 100, an occurrence of a first monitoring event with respect to an object is detected in the monitored image, and after the lapse of the input duration time, an occurrence of a second monitoring event with respect to the object in relation to the occurrence of the first monitoring event is detected.

The terms and words used in the present specification and claims should not be interpreted as being limited to typical meanings or dictionary definitions, but should be construed as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

The invention claimed is:

1. An event detecting method of an image monitoring device, the method comprising:
    setting first and second monitoring events related to a monitored image;
    obtaining a monitored image;
    detecting an occurrence of a first monitoring event with respect to an object from the obtained monitored image;
    detecting an occurrence of a second monitoring event with respect to the object from the obtained monitored image when the first monitoring event occurs; and
    storing information regarding the detected occurrence of the second monitoring event,
    wherein the setting the first and second monitoring events comprises:
        setting at least one of a position in which a first region corresponding to the first monitoring event is set, a size of the first region, and a shape of the first region based on a user input, wherein the first monitoring event occurs within the first region;
        setting at least one of a position in which a second region corresponding to the second monitoring event is set, a size of the second region, and a shape of the second region based on a user input, wherein the second monitoring event occurs within the second region;
        inputting sequence information with respect to the first and second monitoring events;
        determining the first and second monitoring events based on the sequence information; and
        setting a duration time between the first and second monitoring events,
        wherein the information is stored only if the occurrence of the second monitoring event is detected after a lapse of the duration time from the occurrence of the first monitoring event.

2. The event detecting method of claim 1, further comprising:
    displaying a first monitoring item reflecting an attribute of the first monitoring event and a second monitoring item reflecting an attribute of the second monitoring event.

3. The event detecting method of claim 2, wherein a shape of the first monitoring item and the second monitoring item are at least one of a line or a closed curve including a polygonal shape.

4. The event detecting method of claim 2, wherein at least one of positions in which the first monitoring item and the second monitoring item are displayed, sizes of the first monitoring item and the second monitoring item, and shapes of the first monitoring item and the second monitoring items is set or changed by a user.

5. The event detecting method of claim 1, wherein the first monitoring event is a monitoring event the same as the second monitoring event.

6. The event detecting method of claim 1, wherein in the detecting of the occurrence of the second monitoring event, after the lapse of a predetermined time, the occurrence of the second monitoring event with respect to the object is detected from the obtained monitored image.

7. The event detecting method of claim 1, further comprising:
  outputting information regarding the detected occurrence of the second monitoring event.

8. The event detecting method of claim 1, further comprising:
  generating a warning message on the basis of the information regarding the detected occurrence of the second monitoring event; and
  outputting the warning message.

9. The event detecting method of claim 1, wherein the information regarding the detected occurrence of the second monitoring event includes at least one of identification information and attribute information regarding the object.

10. The event detecting method of claim 1, wherein the detecting of the occurrence of the first monitoring event comprises: identifying the object.

11. The event detecting method of claim 10, wherein the detecting of the occurrence of the first monitoring event comprises:
  tracing the identified object.

12. An image monitoring device comprising:
  an image processing unit configured to obtain a monitored image;
  a monitoring control unit configured to set first and second monitoring events related to the monitored image, detect an occurrence of a first monitoring event with respect to an object from the obtained monitored image and detect an occurrence of a second monitoring event with respect to the object from the obtained monitored image when the first monitoring event occurs; and
  a storage unit configured to store information regarding the detected occurrence of the second monitoring event characterized in that the monitoring control unit is further configured to:
  set at least one of a position in which a first region corresponding to the first monitoring event is set, a size of the first region, and a shape of the first region based on a user input;
  set at least one of a position in which a second region corresponding to the second monitoring event is set, a size of the second region, and a shape of the second region based on a user input;
  input sequence information with respect to the first and second monitoring events;
  determine the first and second monitoring events based on the sequence information; and
  set a duration time between the first and second monitoring events,
  wherein the information is stored only if the occurrence of the second monitoring event is detected after a lapse of the duration time from the occurrence of the first monitoring event.

* * * * *